UNITED STATES PATENT OFFICE.

ALEXANDER W. PHILLIPS, OF EAST ORANGE, NEW JERSEY.

TREATING CELLULOSE-ESTER PRODUCTS.

1,411,669.     Specification of Letters Patent.     Patented Apr. 4, 1922.

No Drawing. Original application filed March 24, 1921, Serial No. 455,183. Divided and this application filed January 3, 1922. Serial No. 526,767.

*To all whom it may concern:*

Be it known that I, ALEXANDER W. PHILLIPS, a citizen of the United States, residing at East Orange, in the county of Essex and State of New Jersey, have invented certain new and useful Improvements in Treating Cellulose-Ester Products, of which the following is a specification.

This invention relates to cellulose esters and particularly to nitrocellulose products of relatively low viscosity and a process for making the same. Heretofore the viscosity of nitrocellulose compositions where important has been controlled by the selection and preparation of the raw materials and by the treatment during the process of nitration. In many applications, as for example, in making smokeless powder, but little, if any, attention is given to the matter of viscosity and the result is normally a product having a relatively high viscosity. In certain other applications, as for example, in leather dopes, the matter of viscosity is of importance. But to attain the desired degree of viscosity by the selection of materials and controlling their preparation and nitration introduces considerable difficulty in the control of the processes employed and also more or less effects the yield of the processes.

In speaking here of the viscosity of nitrocellulose products, which are often solids, what is meant is the viscosity of doughs and solutions which result from the incorporation of suitable solvent mixtures with the nitrocellulose products.

I have discovered that after nitration a determined degree of permanent lower viscosity may be imparted to the product.

In carrying out my invention I employ—(1) nitrocelluloses of varying degrees of nitration, and (2) nitrocellulose products which have been made by gelatinating the nitrated cellulose by means of solvents or gelatinating agents, and wherein the nitrocellulose has lost its fibrous form and has become a gel. In the commercial forms of the latter the gel, while usually a solid, still retains some of the solvents or gelatinating agents originally incorporated with it. Examples of this group are celluloid, smokeless powders, nitrocellulose films and nitrocellulose coatings used among other purposes, to imitate leather. These products may and usually do contain other ingredients than residual solvents and gelatinating agents, such as oils, pigments, stabilizers or antacids, coloring matters, diluents, gums, and many other substances incorporated to impart desired characteristics, or resulting from impurities or reactions among the ingredients. I have discovered that by subjecting nitrocellulose and such gelatinated nitrocellulose products to heat under proper conditions the viscosity will be permanently lowered. The process may be carried out by—(a) dry heating, or (b) by heating the materials in the presence of water or other nonsolvent liquid or liquid having low solvent power, or (c) by a combination of the foregoing simultaneously, or consecutively, or both.

Preferably, in carrying out procedure (b) I mix the material, for example, smokeless powder, with water or other non-solvent liquid and heat the mixture in an autoclave under a steam pressure of from slightly above atmospheric pressure up to and in some cases beyond 40 pounds gauge pressure. These treatments subject the mixture to temperatures of from approximately 100° C. to 140° C. or higher corresponding to the steam pressure maintained. In some instances I have maintained a lower temperature for a greater duration of time and have obtained a product of similar viscosity to that obtained by maintaining a higher temperature for a lesser time of treatment. For example, I heated three samples of smokeless powder and determined the viscosity of equally concentrated solutions of each in a solvent mixture composed of ethyl acetate and benzol. One sample was heated at the temperature of and submerged in boiling water for about eighteen hours and at the end of that time it had attained approximately the same viscosity as another similar sample which was heated while submerged in water in an autoclave at approximately 120° C. during seven hours. The third sample when heated while submerged in water in the autoclave at a temperature of approximately 140° C. attained in one and one half hours a viscosity lower than either of the other two. Thus by a suitable selection of temperature range and duration of treatment it is possible by procedure (b) to control the reduction in viscosity of the nitrocellulose quite accurately.

By dry heating according to procedure (a) in air, or in the presence of indifferent gases which is safer from the view point of conflagrations, I find that the nitrocellulose and its products are so altered that the viscosity of the colloid solutions and doughs subsequently made with solvents from a product so treated is very greatly lowered as compared with a similar solution or dough made from the original untreated material. For example, a solution of a nitrocellulose or nitrocellulose product which has been for two hours subjected to a temperature of 120° C. will be found to be much more fluid than a similar solution of equal concentration made from the untreated material. If heated for three hours at a temperature of 130° C. the viscosity will be found to be lower than that of a similar material which has never been subjected to this temperature.

By my process it is possible to prepare from the nitrocelluloses and nitrocellulose products described products which have a very low degree of viscosity and this alteration is permanent so that the material in its various commercial solutions and doughs shows a decreased viscosity adapting it for a wide variety of uses to which it could not hitherto be put. Smokeless powder subjected to any of the above treatments loses a considerable part of its residual solvents so that its solvent content is reduced below the normal solvent content of smokeless powder and it becomes dry in appearance and brittle losing its normal compressibility and tending to break and crack when compressed.

This application is a division of my copending application Serial Number 455,183, filed March 24, 1921.

I claim:—

1. The process of lowering the viscosity of a gelatinated cellulose ester product which consists in heating the same in the presence of a non-solvent fluid until the desired degree of viscosity is attained.

2. The process of lowering the viscosity of a cellulose ester product which consists of treating the ester product to gelatinate it and then heating the gelatinated ester product in the presence of a non-solvent fluid until the desired degree of viscosity is attained.

3. The process of lowering the viscosity of a gelatinated cellulose ester product which consists in heating the same in the presence of a non-solvent liquid until the desired degree of viscosity is attained.

4. The process of lowering the viscosity of smokeless powder which consists in heating the same in the presence of a non-solvent liquid until the desired degree of viscosity is attained.

5. The process of reducing the viscosity of a gelatinated cellulose ester product consisting in heating the same in a non-solvent medium to a temperature between that at which substantial change in viscosity takes place and the temperature at which the compound in question is decomposed.

6. A composition of matter comprising smokeless powder material having its viscosity reduced below the lowest normal viscosity of smokeless powder and its solvents reduced below the lowest normal solvent content of the smokeless powder so that said smokeless powder is brittle and relatively incompressible without breaking and is adapted in solution to serve as a lacquer or spray.

7. The process of lowering the viscosity of a gelatinated cellulose ester product by heating the same in solid form at a temperature above 100° C. until the desired lower degree of viscosity is attained.

8. The process of lowering the viscosity of smokeless powder which consists in heating it in solid form in a medium which will not readily support its combustion, until the desired lower degree of viscosity is attained.

9. The process of producing a gelatinated cellulose ester product of low viscosity comprising making a cellulose ester of relatively high viscosity, treating said ester with a solvent to gelatinate it, and subsequently treating said gelatinated cellulose ester in a non-solvent medium to lower its viscosity a desired degree below said original viscosity.

10. The process of producing a gelatinated cellulose ester product of low viscosity comprising treating a cellulose ester of relatively high viscosity with a solvent to gelatinate it, and subsequently treating said gelatinated cellulose ester in a non-solvent medium to lower its final viscosity a desired degree below its original viscosity.

11. The process of producing a gelatinated cellulose ester product of low viscosity comprising subjecting a relatively highly viscuous cellulose ester gelatinated by treatment with a solvent to treatment in a non-solvent medium to lower its final viscosity a desired degree below its original viscosity.

ALEXANDER W. PHILLIPS.